(12) United States Patent
Chiou et al.

(10) Patent No.: US 7,140,029 B2
(45) Date of Patent: Nov. 21, 2006

(54) SLIDING MECHANISM FOR OPTICAL COMPACT DISK DRIVE

(75) Inventors: Yao Jia Chiou, Chang Hua Hsien (TW); Jen-Chen Wu, Yunlin (TW)

(73) Assignee: Micro-Star Int'l Co., Ltd., Taipei Hsien (TW)

( * ) Notice: Subject to any disclaimer, the term of this patent is extended or adjusted under 35 U.S.C. 154(b) by 423 days.

(21) Appl. No.: 10/637,543

(22) Filed: Aug. 11, 2003

(65) Prior Publication Data

US 2005/0039199 A1  Feb. 17, 2005

(51) Int. Cl.
G11B 33/02 (2006.01)
(52) U.S. Cl. ..................................... 720/613
(58) Field of Classification Search ............... 720/613, 720/601
See application file for complete search history.

(56) References Cited

U.S. PATENT DOCUMENTS 6,208,605 B1* 3/2001 Akiba ........................ 720/613
2003/0117928 A1* 6/2003 Choi et al. .................. 369/75.2
2004/0154031 A1* 8/2004 Kimura et al. .............. 720/613
2005/0010938 A1* 1/2005 Tamura ....................... 720/613
2005/0015787 A1* 1/2005 Sakagami .................... 720/613
2005/0039199 A1* 2/2005 Chiou et al. ................ 720/613

* cited by examiner

Primary Examiner—Brian E. Miller
(74) Attorney, Agent, or Firm—Rosenberg, Klein & Lee

(57) ABSTRACT

A sliding mechanism for an optical compact disk drive includes right and left slide tracks respectively mounted at opposite sides of a tray of the optical compact disk drive. A plurality of bulbous contacts are formed on the right and left slide tracks respectively to fit with a plurality of retaining portions of a lower cover of the optical compact disk drive. By respectively having the bulbous contacts in point to point contact with the corresponding retaining portions, the tray smoothly moves in a stable manner between its outermost and innermost positions. A slide body of each slide track is provided with a hook, a protection piece and a fastening piece to hold the tray at its outermost or innermost positions. Thereby, the stability and effectiveness of the optical compact disk drive assembled with the sliding mechanism of the invention is increased.

9 Claims, 9 Drawing Sheets

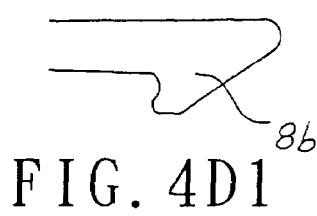
FIG. 4D1
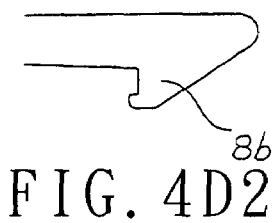
FIG. 4D2
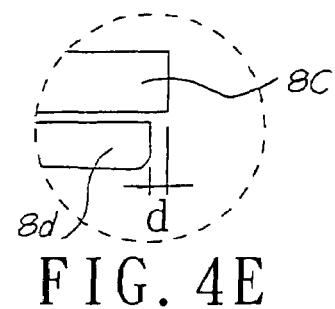
FIG. 4E
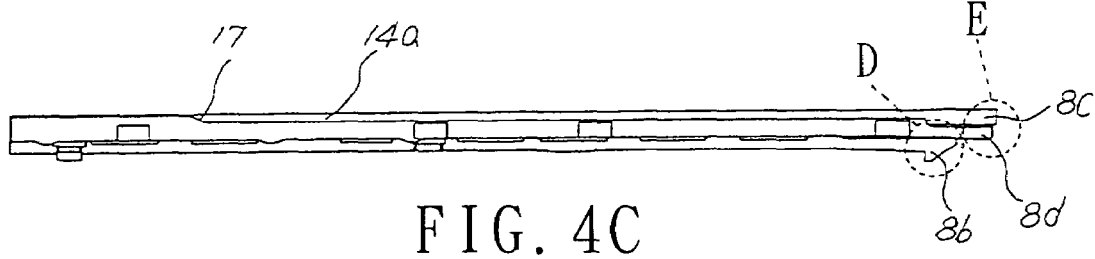
FIG. 4C
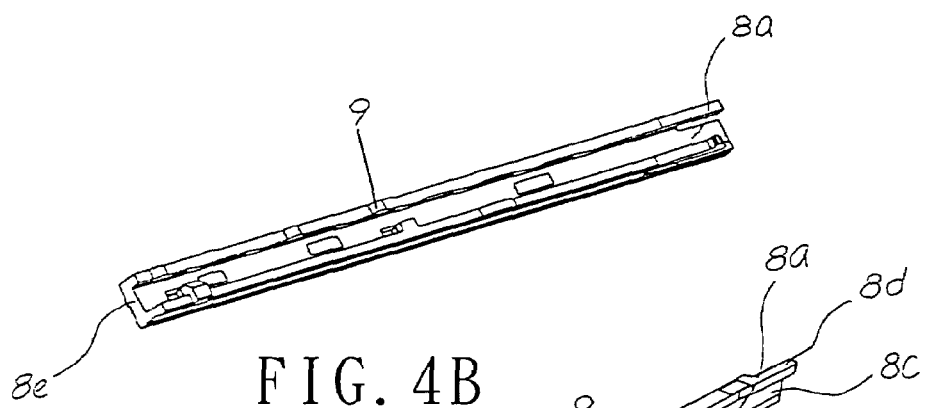
FIG. 4B
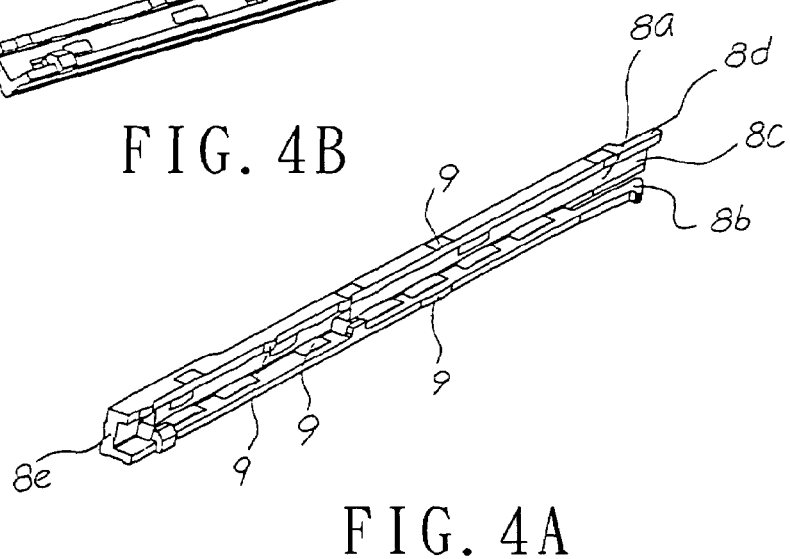
FIG. 4A

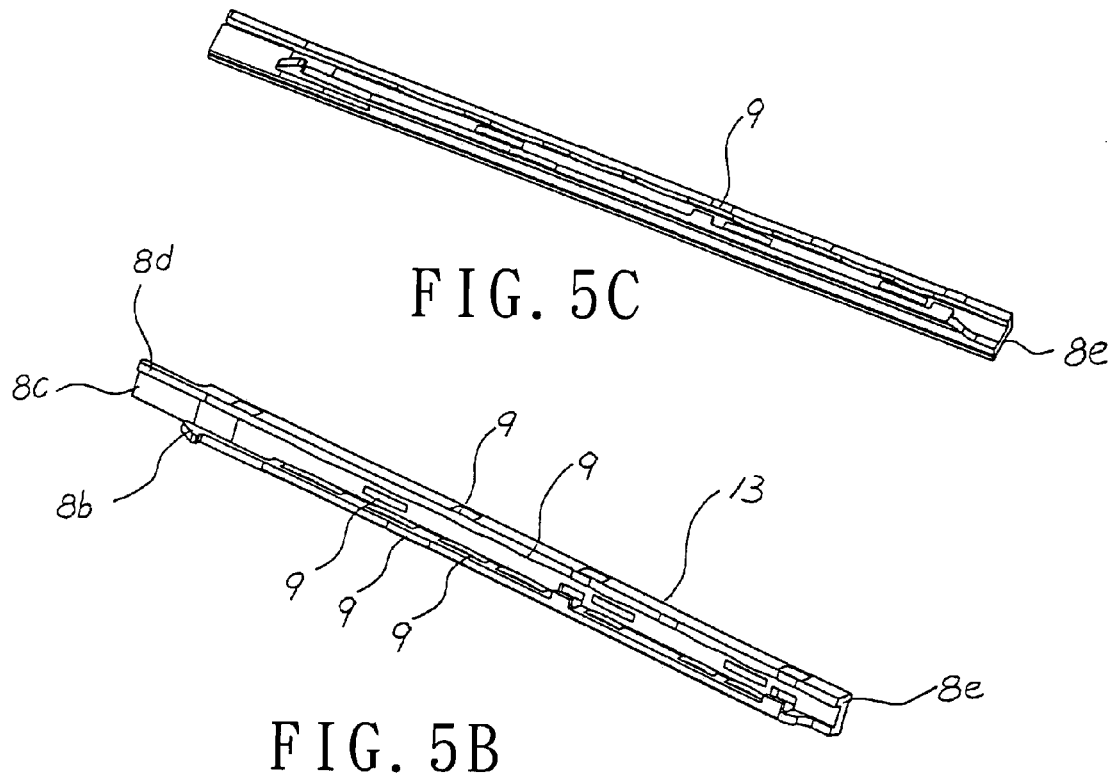
FIG. 5C
FIG. 5B
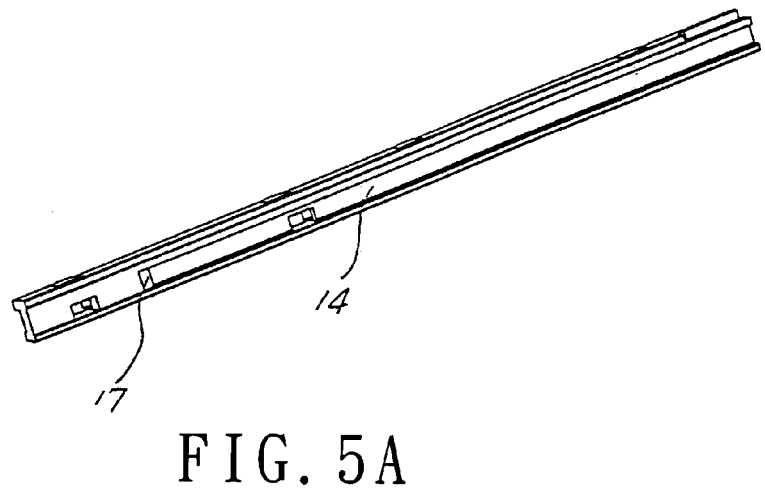
FIG. 5A

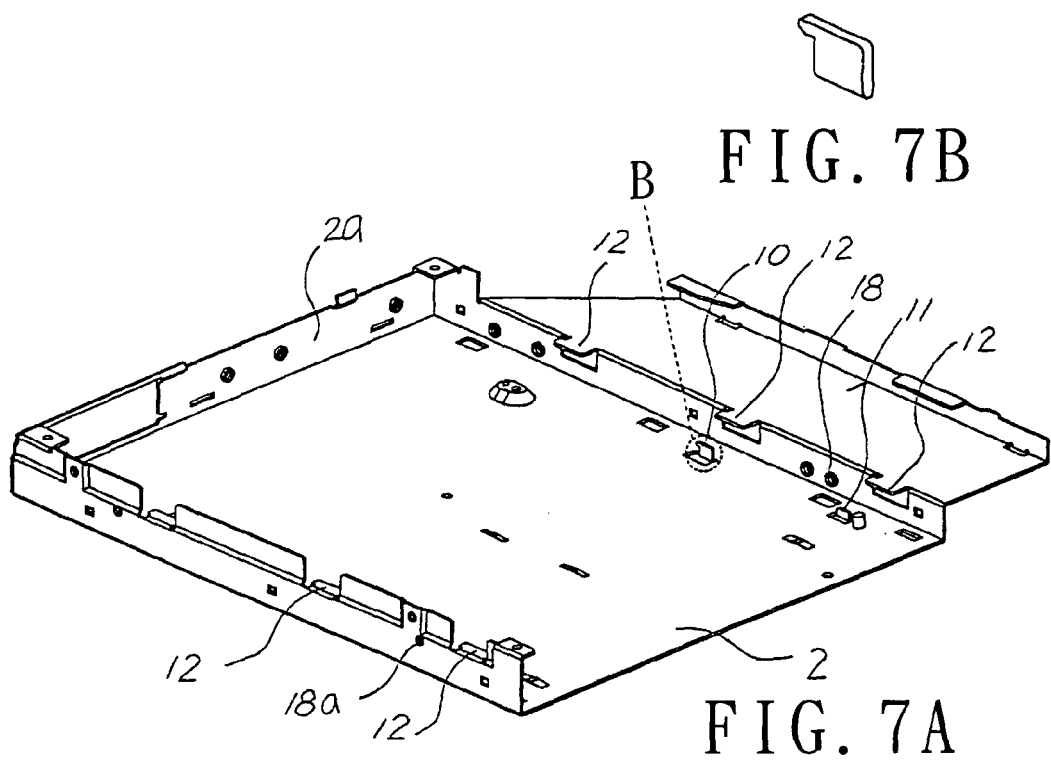
FIG. 7B
FIG. 7A
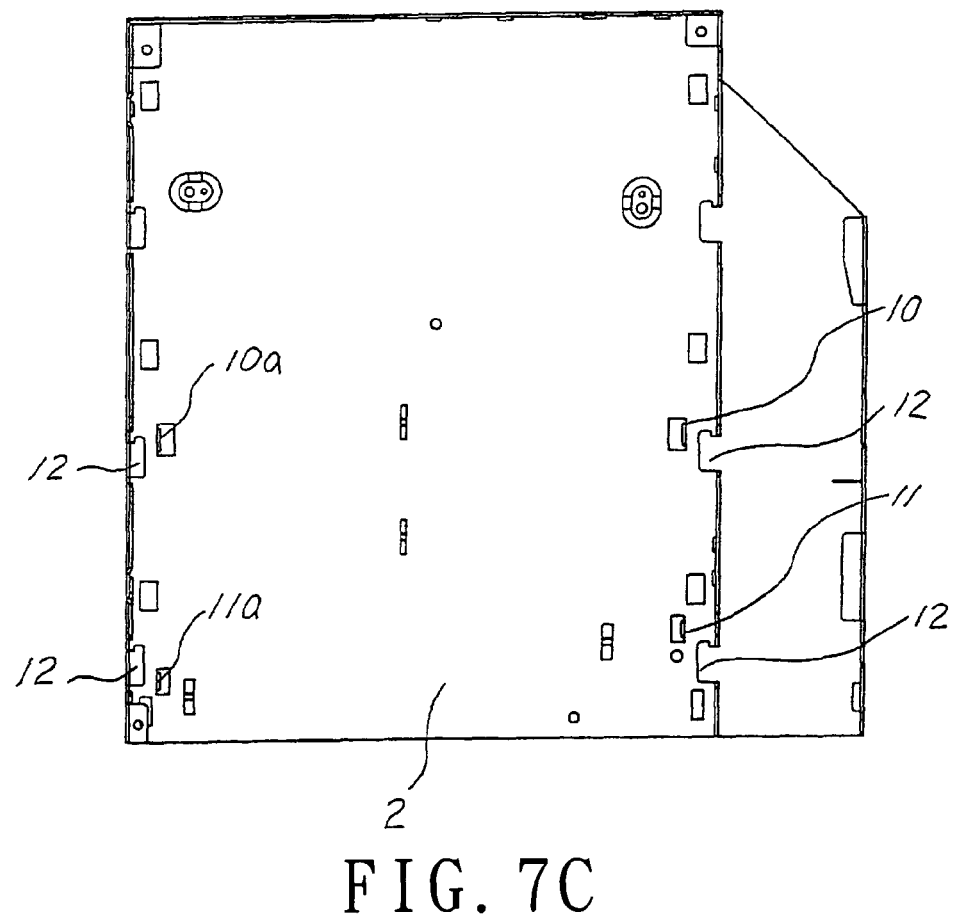
FIG. 7C

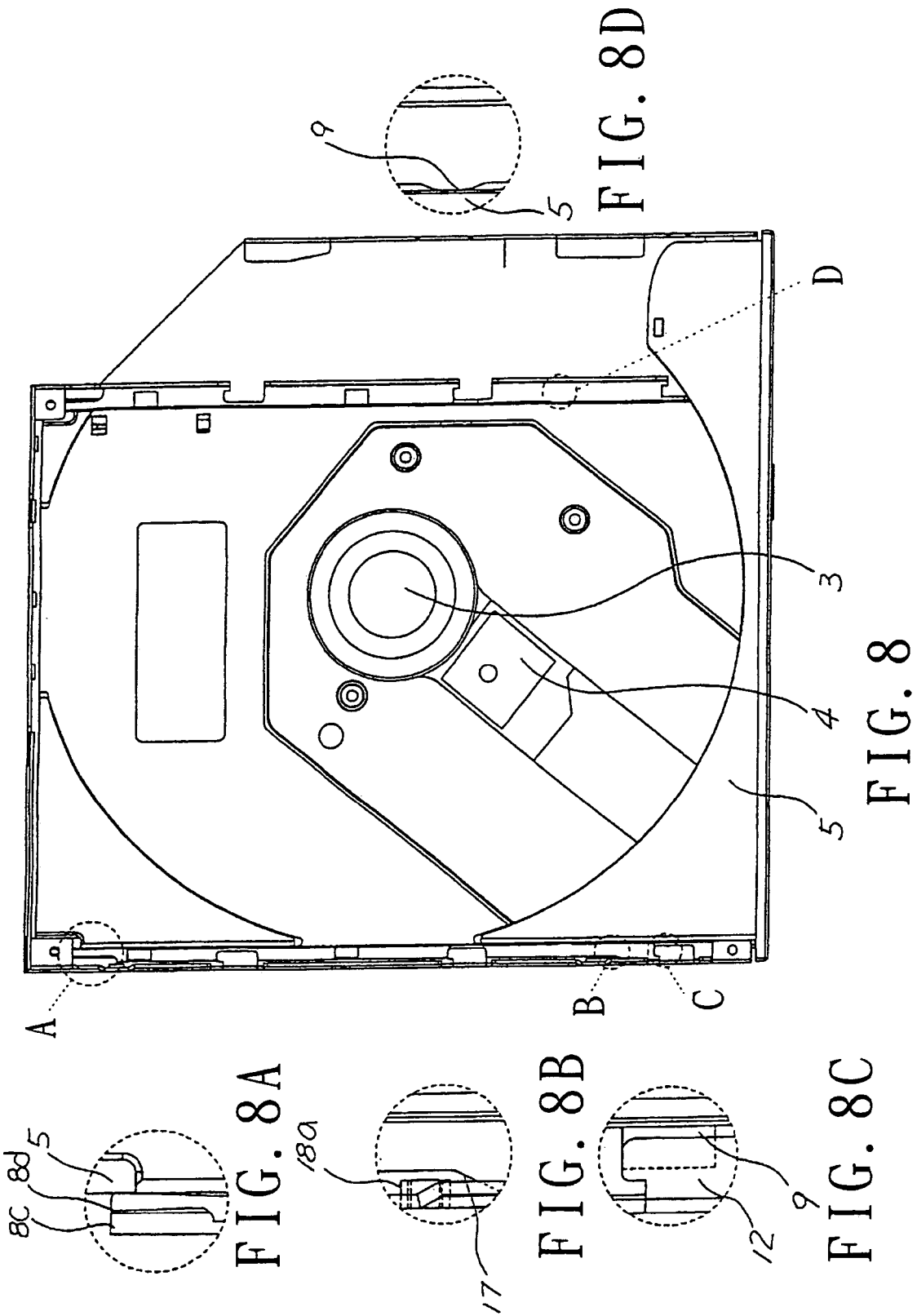

SLIDING MECHANISM FOR OPTICAL COMPACT DISK DRIVE

BACKGROUND OF THE INVENTION

1. Field of the Invention

The present invention relates to a sliding mechanism for an optical compact disk drive. More particularly, the present invention relates to a sliding mechanism that includes a pair of slide tracks respectively mounted at opposite sides of a tray of an optical compact disk drive. A plurality of bulbous contacts are respectively formed on the right and left slide tracks to fit retaining portions of a lower cover of the optical compact disk drive. By respectively having the bulbous contacts in point-to-point contact with the corresponding retaining portions, the tray moves forth and back with reduced frictions. A slide body is provided with a hook, a protection piece, and a fastening piece. The hook and fastening piece have an inclined angle inclined inwardly toward the shaft motor for firmly clamping the tray's outermost and innermost portions respectively. The stability of the optical compact disk drive assembled with the sliding mechanism of the invention is increased. Furthermore, the amount of slide tracks is reduced and the production cost and assembly cost are therefore reduced.

2. Description of Related Art

When the tray of an optical compact disk drive is pulled out to an outmost position away from the optical compact disk drive, a compact disk is placed on the tray that, then, is pushed back along the same path. The data of the compact disk then is read by a read/write head 4 of the optical compact disk drive.

Referring to FIG. 1, a pair of punched metal slide tracks 7 are respectively formed between the tray 5 and a pair of injection-molded plastic tracks 6 inside a conventional optical compact disk drive. When the tray 5 is pulled out, it moves along the punched metal slide tracks 7 and the injection-formed plastic tracks 6 (i.e. dual-track sliding mechanism). However, the tray holder of the above optical compact disk drive practically has the following disadvantages.

When the tray 5 is pulled to an outmost position away from the optical compact disk drive, the configuration of the dual-track sliding mechanism causes slight loosening during operation. The dual-track sliding mechanism needs at least four tracks, which increases the production cost. The punched tracks 7 are not able to provide a firm holding. Therefore, the tray 5 may experience slight loosing during operation, which impacts the quality of the product.

When the tray 5 is pushed to an innermost position in the optical compact disk drive, the total gap between the tracks makes the tray 5 vibrate and generates noise when a shaft motor 3 of the optical compact disk drive rotates at high-speed.

SUMMARY OF THE INVENTION

It is therefore an object of the invention to provide a sliding mechanism that can overcome the above disadvantages of the prior art. The sliding mechanism includes a right slide track 13 and a left slide track 13a respectively mounted at opposite sides of a tray 5 of a optical compact disk drive. A plurality of bulbous contacts 9 are respectively formed on the right and left slide tracks to fit retaining portions of a lower cover of the optical compact disk drive. By respectively placing the bulbous contacts against the corresponding retaining portions, the tray 5 moves forth and back in a stable manner with reduced friction. The amount of slide tracks is reduced and thus the gap between the slide tracks is also reduced. The tray 5 remains stable, even when being pulled out to an outmost position away from the optical compact disk drive and pushed in to its innermost position. When the tray 5 of the optical compact disk drive is pushed in to an innermost position inside the optical compact disk drive, the vibration caused by rotation of a shaft motor 3 is greatly reduced, which allows the optical compact disk drive to be operated under a stable condition. The hooks of the right and left slide tracks are designed to be hooked with the right rear bent portion and the left rear bent portion, which prevents any slipping of the tray 5.

To provide a further understanding of the invention, the following detailed description illustrates embodiments and examples of the invention, this detailed description being provided only for illustration of the invention.

BRIEF DESCRIPTION OF THE DRAWINGS

The drawings included herein provide a further understanding of the invention. A brief introduction of the drawings is as follows:

FIG. 4A is a schematic view of a left slide track of a sliding mechanism according to one embodiment of the present invention;

FIG. 4B and FIG. 4C are enlarged views of a slide body of the left slide track according to one embodiment of the present invention;

FIG. 4D1 is an enlarged view of a hook on the left slide track of the sliding mechanism according to one embodiment of the present invention;

FIG. 4D2 is an enlarged view of a hook on the left slide track of the sliding mechanism according to another embodiment of the present invention;

FIG. 4E is an enlarged view of the region E of FIG. 4C;

FIG. 5A to FIG. 5C are schematic views illustrating a right slide track according to one embodiment of the present invention;

FIG. 7A is a perspective view of a lower cover of the optical compact disk drive according to one embodiment of the present invention;

FIG. 7B is an enlarged view of a bent portion of the lower cover according to one embodiment of the present invention;

FIG. 7C is a schematic view of the lower cover according to one embodiment of the present invention;

FIG. 8 is a schematic view of a tray located at an innermost position inside the optical compact disk drive according to one embodiment of the present invention;

FIG. 8A is an enlarged view of the region A of FIG. 8;

FIG. 8B is an enlarged view of the region B of FIG. 8;

FIG. 8C is an enlarged view of the region C of FIG. 8;

FIG. 8D is an enlarged view of the region D of FIG. 8.

DETAILED DESCRIPTION OF PREFERRED EMBODIMENTS

Figure 1:
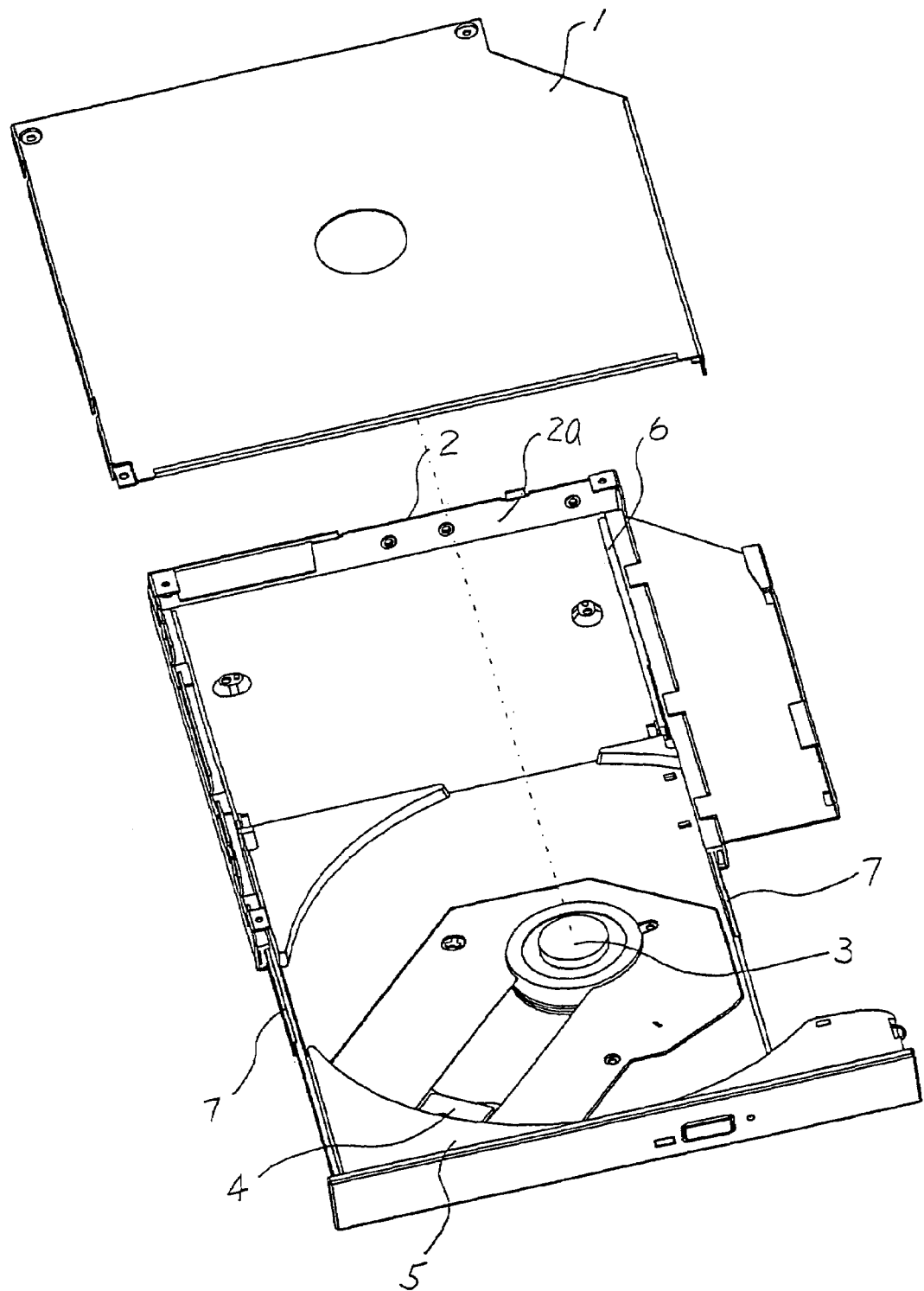
FIG. 1 is a schematic view of a conventional dual-track optical compact disk drive.

Wherever possible in the following description, like reference numerals will refer to like elements and parts unless otherwise illustrated.

Figure 2:
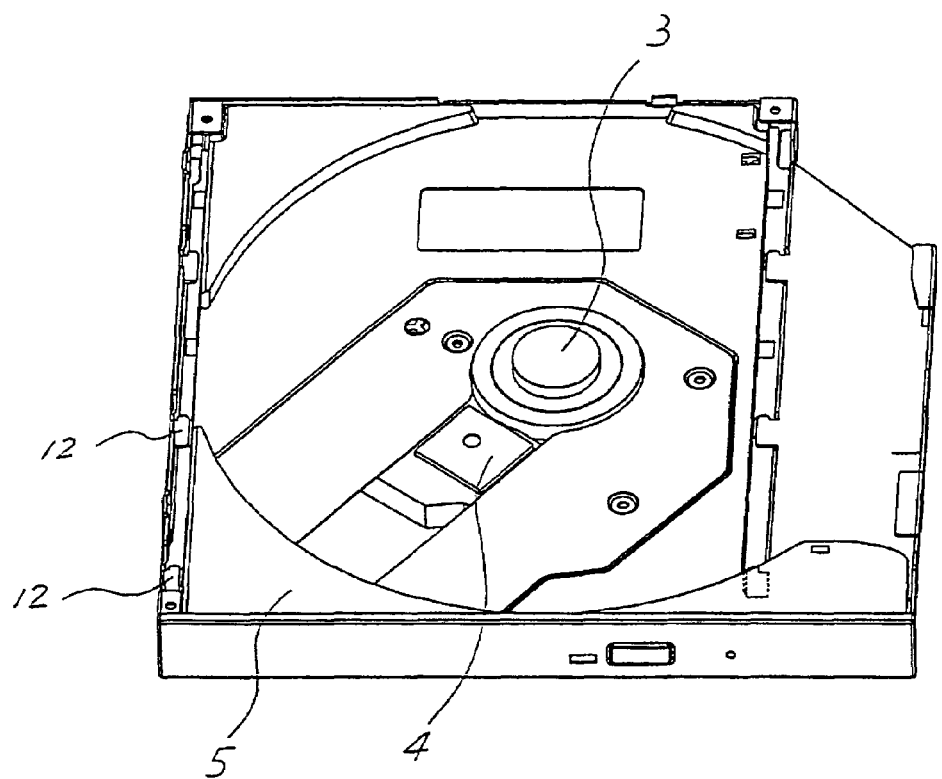
FIG. 2 is a schematic view illustrating a sliding mechanism at an innermost position inside an optical compact disk drive according to one embodiment of the present invention.

Referring to FIG. 2, the present invention provides a single-track sliding mechanism for an optical compact disk drive, including an upper cover 1, a lower cover 2, a tray 5, a right slide track 13 and a left slide track 13a. The right slide track 13 and the left slide track 13a are respectively mounted at either side of the tray 5. The tray 5 is slidably mounted between the upper cover 1 and the lower cover 2, and slides forward and backward along the right slide track 13 and the left slide track 13a.

FIG. 4A to FIG. 4E are schematic views of a left slide track 13a. FIG. 5A through FIG. 5C are schematic views of the right slide track 13. As illustrated, each of the right slide tracks 13 and left slide tracks 13a includes an extended track 8e and a slide body 8a. The slide body 8a provides a hook 8b, a protection piece 8c and a fastening piece 8d. The hook 8b has an inside part at a crook thereof. The fastening piece 8d includes an incline angle inwardly toward the hook 8b.

Figure 6:
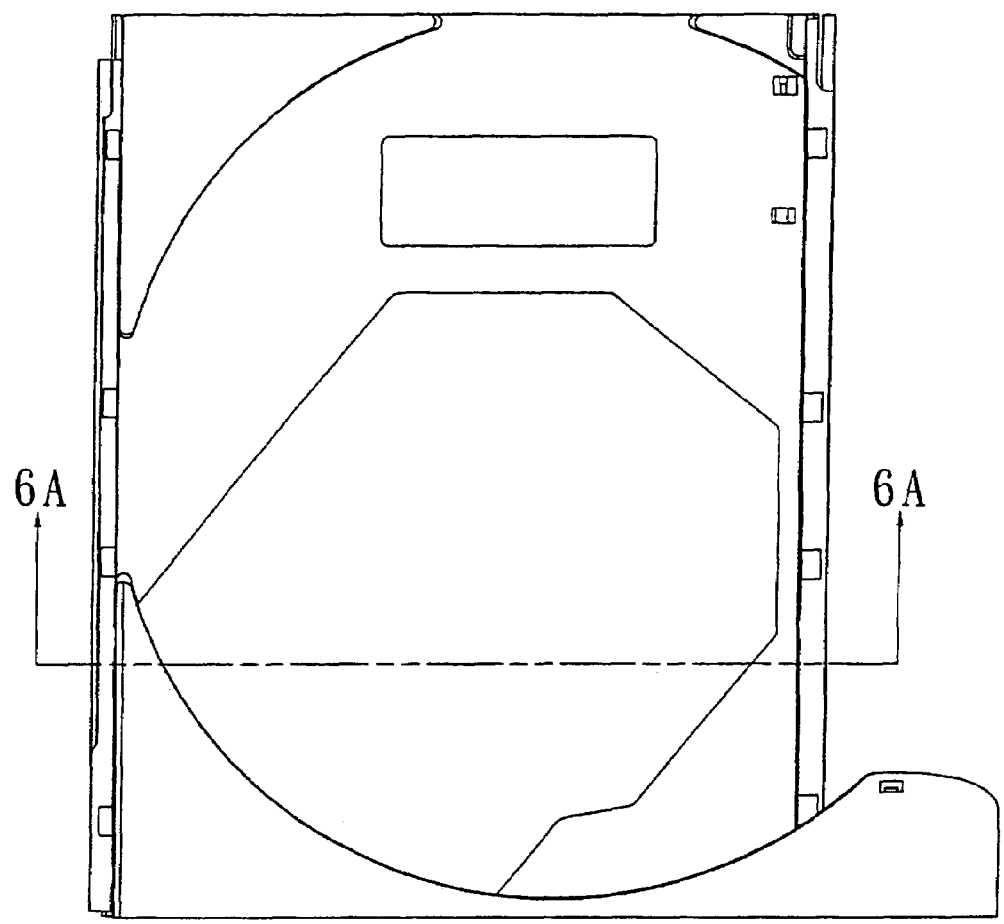
FIG. 6 is a top view of the optical compact disk drive according to one embodiment of the present invention.
Figure 6A:
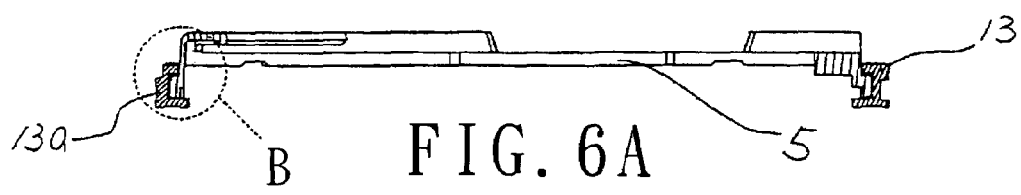
FIG. 6A is a cross-sectional view of the optical compact disk drive taken along line 6A—6A according to one embodiment of the present invention.
Figure 6B:
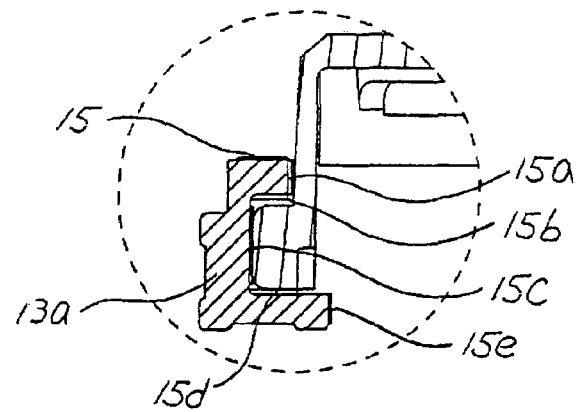
FIG. 6B is a partially enlarged cross-sectional view of the region B of FIG. 6A.

A plurality of bulbous contacts 9 are respectively formed on an upper inner surface 15b, an upper side external surface 15a, an upper inner surface 15b, a side inner surface 15c, a lower inner surface 15d and a lower side external surface 15e of the right slide track 13 and of the left slide track 13a, as shown in FIG. 6. The bulbous contacts 9 can be arranged in a symmetric or non-symmetric manner. In the right slide track 13, a right slot 14 and a sloping part 17 are sequentially formed extending from the slide body 8a to the extended track 8e, closely adjacent to a periphery of the lower cover 2, for alignment with and attaching on a screw hole 18 (FIG. 7A). Similarly, the left slot 14a and the sloping part 17 are sequentially formed extending from the slide body 8a to the extended track 8e in the left slide track 13a, closely adjacent to a periphery of the lower cover 2, for alignment with and attaching on the screw hole 18a. Since the locations of the screw holes 18, 18a are standardized and fixed, the right slot 14 of the right slide track 13 is longer than the left slot 14a of the left slide track 13a. The tray 5 is slidably mounted inside the right slot 13 and the left slot 13a to freely slide in and out of the lower cover 2 of the optical compact disk drive.

When the tray 5 is pushed in the innermost position of the optical compact disk drive (as shown in FIG. 6 and FIG. 8), the bulbous contacts 9 on the upper inner surface 15b and the lower inner surface 15d hold the upper and lower portions of the tray 5. A plurality of retaining portions 12 are formed along each of the opposite sides of the lower cover 2 (FIG. 7A to FIG. 7C). The bulbous contacts 9 close to the extended track 8e bear against the corresponding retaining portions 12 arranged in two parallel columns, as shown in FIG. 4A, FIG. 4B, FIG. 5B and FIG. 5C. The left portion and the right portion of the tray 5 is held by the bulbous contacts 9 on the upper side external surface 15a and the side inner surface 15c of the right slide track 13 and the left slide track 13a. The protection piece 8c, being longer than the fastening piece 8d, protects the fastening piece 8d which each have an inclined angle being inclined inwardly toward the hook 8b, when the tray 5 is pushed into the innermost position of the optical compact disk drive, it will be securely clamped with the fastening pieces 8d through said incline angle, as shown in FIG. 2.

When the right slide track 13 and the left slide track 13a are to slide inwardly, the sloping portions 17 of the right slide tracks 13 and left slide tracks 13a come in contact with the right and left screw holes 18, 18a to provide a cushion effect when any accidental shock occurs.

Figure 3:
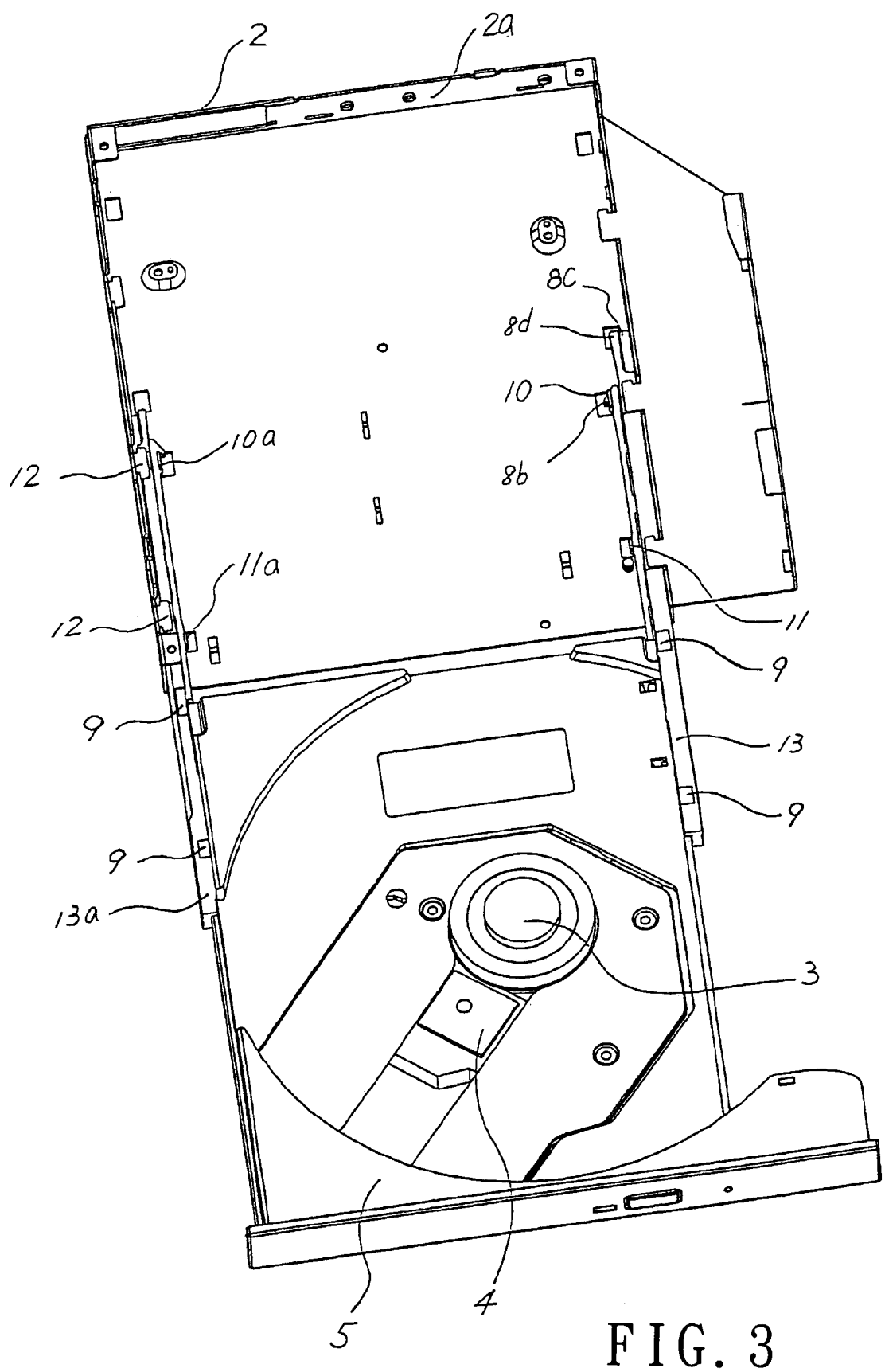
FIG. 3 is a schematic view illustrating a sliding mechanism at an outermost position out of the optical compact disk drive according to one embodiment of the present invention.
Figures 9, 9A, 9B:
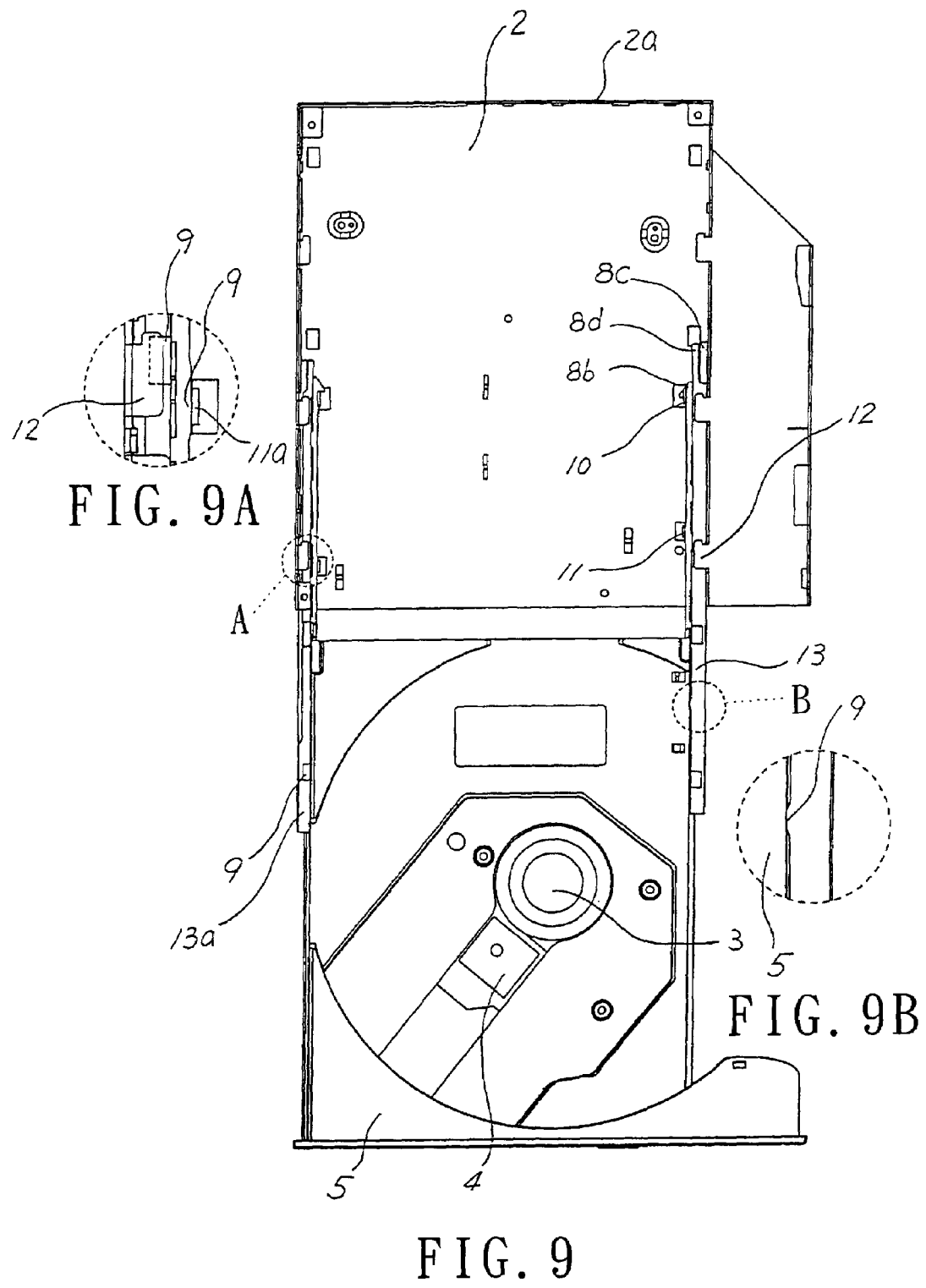
FIG. 9 is a schematic view of a tray located at an innermost position inside the optical compact disk drive according to one embodiment of the present invention.
FIG. 9A is an enlarged view of the region A of FIG. 9.
FIG. 9B is an enlarged view of the region B of FIG. 9.

When the tray 5 is to pull out to an outmost position away from the optical compact disk drive (see FIG. 6 and FIG. 9), the tray 5 outwardly slides along the right and left slides 13, 13a to a predetermined position. Thereafter, the tray S slides out of the optical compact disk drive together with the right slide tracks 13 and left slide tracks 13a to access a compact disk. At this moment, the right slide tracks 13 and left slide tracks 13a support the tray 5. The upper and lower portions of the tray 5 are held by the bulbous contacts 9 on the upper inner surface 15b and the lower inner surface 15d of the right slide tracks 13 and left slide tracks 13a. The left portion and the right portion of the tray 5 are held by the bulbous contacts 9 on the upper side external surface 15a and the side inner surface 15c of the right slide tracks 13 and left slide tracks 13a. The upper and lower portions of each of the right slide tracks 13 and left slide tracks 13a are held by placing the bulbous contacts 9 close to the slide body 8a perfectly against the corresponding retaining portions 12 (see FIG. 3) of the lower cover 2. The left and right portions of each of the right slide tracks 13 and left slide tracks 13a are held by (1) allowing the bulbous contacts 9 on the lower side external surfaces 15e of the right slide tracks 13 and left slide tracks 13a to contact a first set of bent portions 11, 11a, and (2) hooking the hook 8b to a second set of bent portions 10, 10a (see FIG. 3).

When the tray 5 is to be pushed outwardly to an outmost position, the hooks 8b of the right slide 13 and the left slide 13a respectively hook the right rear bent portion 10 and the left rear bent portion 10a. The hook 8b is designed to have any shape that prevents slipping of the tray 5. FIG. 4D1 and FIG. 4D2 show two examples of the configuration of the hook 8b. However, the shape of the hook 8b is not limited to the above example.

The sliding mechanism of the invention can simultaneously and firmly hold the upper, the lower, the left and the right portions of the tray 5 to keep the tray 5 in a stable position when a high speed rotation of a shaft motor 3 and an operation of the read/write head 4 take place. Furthermore, only one pair of slide tracks is needed to firmly hold the tray of the sliding mechanism and allow stable reversible operation of the sliding mechanism. The required amount of parts and thus the weight of the optical compact disk drive are greatly reduced. The punch process of metal tracks as conventionally performed therefore becomes unnecessary in the present invention. As a result, the processing procedure is simplified and the production/assembly cost is reduced, which increases the competitiveness of the product.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A sliding mechanism for an optical compact disk drive, the sliding mechanism comprising:

a right slide track and a left slide track mounted between a tray and a lower cover of the optical compact disk drive and respectively having substantially U shaped sectional contours, wherein each of the right and left slide tracks includes a slide body and an extended track, the slide body provides a hook, a protection piece, and a fastening piece, the hook and the fastening piece each having an inclined portion for firmly engaging the tray a plurality of bulbous contacts formed each of the right and left slide tracks, the bulbous contacts being disposed to oppose respective portions of the tray;

a first set of bent portions and a second set of bent portions formed at a bottom surface of the lower cover to respectively correspond to the bulbous contacts of the right and left slide tracks for fastening the tray relative to the optical compact disk drive, a plurality of retaining portions being formed along opposite sides of the lower cover; whereby the bulbous contacts on the right and left slide tracks bear against the first set of bent portions, the second set of bent portions and the retaining portions to enable stable sliding of the tray, while the tray is pushed in and pulled out of the optical compact disk drive.

2. The mechanism of claim 1, wherein the protection piece is longer than the fastening piece.

3. The mechanism of claim 1, wherein the fastening piece has an incline angle inwardly toward the hook.

4. The mechanism of claim 1, wherein the hook has a cambered surface formed in an inside thereof.

5. The mechanism of claim 1, wherein the hook has a flat surface formed in an inside thereof.

6. The mechanism of claim 1, wherein the first and second sets of bent portions of the lower cover each has a profile in an L shape.

7. The mechanism of claim 1, wherein the retaining portions of the lower cover each has a profile in a reverse L shape.

8. The mechanism of claim 1, wherein the bulbous contacts are arranged in a symmetric manner.

9. The mechanism of claim 1, wherein the bulbous contacts are arranged in a non-symmetric manner.

* * * * *